US009276412B2

(12) United States Patent
Omar et al.

(10) Patent No.: US 9,276,412 B2
(45) Date of Patent: Mar. 1, 2016

(54) SYSTEM FOR SUPPLYING ENERGY

(71) Applicant: Telekom Malaysia Berhad, Kuala Lumpur (MY)

(72) Inventors: Nurul Afzan Omar, Selangor Darul Ehsan (MY); Ashaari Yusoff, Selangor Darul Ehsan (MY); Mohamed Razman Yahya, Selangor Darul Ehsan (MY); Asban Dolah, Selangor Darul Ehsan (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 597 days.

(21) Appl. No.: 13/721,566

(22) Filed: Dec. 20, 2012

(65) Prior Publication Data

US 2013/0169047 A1 Jul. 4, 2013

(30) Foreign Application Priority Data

Dec. 28, 2011 (MY) .......................... PI 2011006301

(51) Int. Cl.
*H02J 4/00* (2006.01)
*E04H 1/12* (2006.01)
*H01L 31/042* (2014.01)

(52) U.S. Cl.
CPC ................ *H02J 4/00* (2013.01); *E04H 1/1211* (2013.01); *H02S 20/00* (2013.01); *Y02E 10/50* (2013.01); *Y10T 307/25* (2015.04); *Y10T 307/344* (2015.04)

(58) Field of Classification Search
CPC .......... E04H 1/1211; H02J 4/00; H02S 20/00; Y02E 10/50
USPC .......................................................... 307/43
See application file for complete search history.

(56) References Cited

U.S. PATENT DOCUMENTS

| | | | | |
|---|---|---|---|---|
| 5,107,637 | A * | 4/1992 | Robbins | 52/28 |
| 5,269,071 | A * | 12/1993 | Hamabe et al. | 34/554 |
| 8,272,175 | B1 * | 9/2012 | Williams-Prades et al. | 52/79.1 |
| 2005/0043885 | A1 * | 2/2005 | Amlinger | 701/204 |
| 2006/0052099 | A1 * | 3/2006 | Parker | 455/426.1 |
| 2011/0005560 | A1 * | 1/2011 | Nair | 135/96 |
| 2011/0058326 | A1 * | 3/2011 | Idems et al. | 361/679.21 |
| 2011/0155150 | A1 * | 6/2011 | Al-Qassem | 131/238 |

* cited by examiner

*Primary Examiner* — Scott Bauer
(74) *Attorney, Agent, or Firm* — Jacobson Holman, PLLC.

(57) ABSTRACT

A system (10) for supplying energy is provided. The system (10) comprises a shelter (12) for a passenger awaiting transport. The shelter (12) has a roof portion (14) and photovoltaic cells (16) disposed on the roof portion (14). The photovoltaic cells (16) are arranged to convert solar energy into electrical energy. The system (10) also comprises an energy distribution system (18) arranged to receive electrical energy from the photovoltaic cells (16) and to provide the electrical energy to at least one electrically powered component (20, 22, 24, 26, 28, 30, 32, 34) of the system (10).

25 Claims, 3 Drawing Sheets

SYSTEM FOR SUPPLYING ENERGY

This application claims the priority of Malaysian no. PI 2011006301 filed Dec. 28, 2011, hereby incorporated by reference.

FIELD OF THE INVENTION

The present invention relates to a system for supplying energy.

BACKGROUND OF THE INVENTION

Shelters that are provided for passengers awaiting transport, such as bus shelters, may provide lighting and other systems that require power. Such a shelter will need to be connected to a power distribution network which will increase the initial cost of installation and attract ongoing power costs.

There is therefore a need for technological advancement.

SUMMARY OF THE INVENTION

In accordance with a first aspect of the present invention there is provided a system for supplying energy, the system comprising:

a shelter for a passenger awaiting transport, the shelter having a roof portion;

photovoltaic cells disposed on the roof portion, the photovoltaic cells being arranged to convert solar energy into electrical energy; and an energy distribution system arranged to receive electrical energy from the photovoltaic cells and to provide the electrical energy to at least one electrically powered component of the system.

The system may comprise at least one of the following electrically powered components:

a carbon collection system;

a lighting system;

a communications system;

a display system;

an audio system;

a security system;

a climate control system;

a power outlet system; and a dryer system.

The system may comprise a battery system arranged to store electrical energy converted by the photovoltaic cells. The system may be arranged such that the electrically powered components of the system can receive stored electrical energy from the battery system, for example at times when sunlight is not impinging on the photovoltaic cells.

The carbon collection system is arranged to remove carbon from air around the shelter. In one example, the carbon collection system is arranged to filter air that is around the shelter so as to remove carbon based pollutants such as carbon dioxide and carbon monoxide for storage in the collection system. Further, or alternatively, for embodiments wherein the shelter is enclosable, the carbon collection system may be arranged to remove carbon from air within the enclosed region.

The carbon collection system provides the advantage of providing for improved air quality in a region surrounding the shelter. Since the transport passenger shelter will typically be located in a region of relatively heavy vehicle traffic, the carbon collection system provides a means for removing carbon that has been emitted by these vehicles, while at the same time not contributing to pollution as the carbon collection system is powered by the solar powered energy distribution system.

The system may be arranged to detect an amount of ambient light and to turn the lighting system on if the amount of detected ambient light is below a predetermined threshold. In one embodiment the system comprises a light detector wherein the amount of ambient light is detected using the light detector. In another embodiment, the amount of ambient light is detected by measuring an output of the photovoltaic cells. In this embodiment, the system is arranged such that, if the output of the photovoltaic cells is below a predetermined threshold, the lighting system is turned on.

The communications system may comprise wireless and/or wired internet access points that are powered by the energy distribution system. The communications system may comprise a telecommunications network interface arranged to allow a user to connect to a core telecommunications network so as to provide telephone, ISDN and broadband such as DSL to the waiting passenger. In one embodiment, the telecommunications network interface is self contained and arranged to be powered by the energy distribution system, thereby allowing the communications system to be installed with relative ease.

The display system and/or the audio system may be arranged to provide information or services such as advertising or entertainment to users of the shelter. The display system and the audio system may operate separately or in conjunction with one another to provide the information or services. Content output by the display and/or audio systems may be provided by the communications system.

The security system may comprise an appropriate security monitoring system such as a closed circuit television system or a security system that uses Internet protocol (IP) cameras. The security system may be arranged to provide security video to security and/or law enforcement personnel to assist in monitoring the safety of passengers using the shelter and to deter vandalism and other acts of antisocial behavior in and around the shelter. The security system can be powered by the energy distribution system and can be arranged to transmit video and/or audio to the security and/or law enforcement personnel via the communications system.

The security system may further comprise a panic button system which, when a panic button is pressed, is arranged to emit an alert through the audio system and/or to alert security and/or law enforcement personnel that the panic button has been pressed.

The climate control system may be any appropriate system that allows a climate of or around shelter to be at least partially controlled. In examples wherein the shelter is fully enclosable, the climate control system may be arranged to control the climate of an enclosed region of the shelter. In such an example, the climate control system may be of the type that is typically used to control the climate of an indoor space, such as an air conditioning system. In one example, the climate control system comprises an air cooler and purifier that is arranged to reduce the ambient temperature of an enclosed region of the shelter to a temperature that is comfortable to waiting passengers and to remove pollutants such as dust and pollen from air within the enclosed region of the shelter.

The power outlet system comprises at least one power outlet to which a waiting passenger is able to connect a power adapter or cable so as to power an electronic device, recharge a battery, or for any other appropriate function that a power outlet is typically used for. The power outlet system may be arranged to cater for power plug configurations that are common in other countries. Power consumed by waiting passengers who use the power outlet system is provided by the energy distribution system.

The dryer system may be arranged to dry waiting passengers and/or their articles such as cloths and bags. This is particularly advantageous in regions where rainfall is common, such as in tropical regions.

The dryer system may have a typical air dryer configuration, wherein the dryer system is arranged to output a stream of warm air through a nozzle in response to a user activating the dryer system. The dryer system of this example can be activated by pressing a button, or by automatic sensing means arranged to detect the presence of an object therebeneath.

BRIEF DESCRIPTION OF THE DRAWINGS

In order that the present invention may be more clearly ascertained, embodiments of the present invention will now be described, by way of example only, with reference to the accompanying drawings, in which.

DESCRIPTION OF AN EMBODIMENT OF THE INVENTION

FIG. 1 shows a system 10 for supplying energy. The system 10 comprises a shelter 12 for passengers awaiting transport, the shelter having a roof portion 14. In this example the shelter 12 is a bus shelter, although it will be appreciated that the shelter 12 may be a train shelter, a tram shelter, a taxi shelter or any appropriate passenger shelter.

Figure 1A:
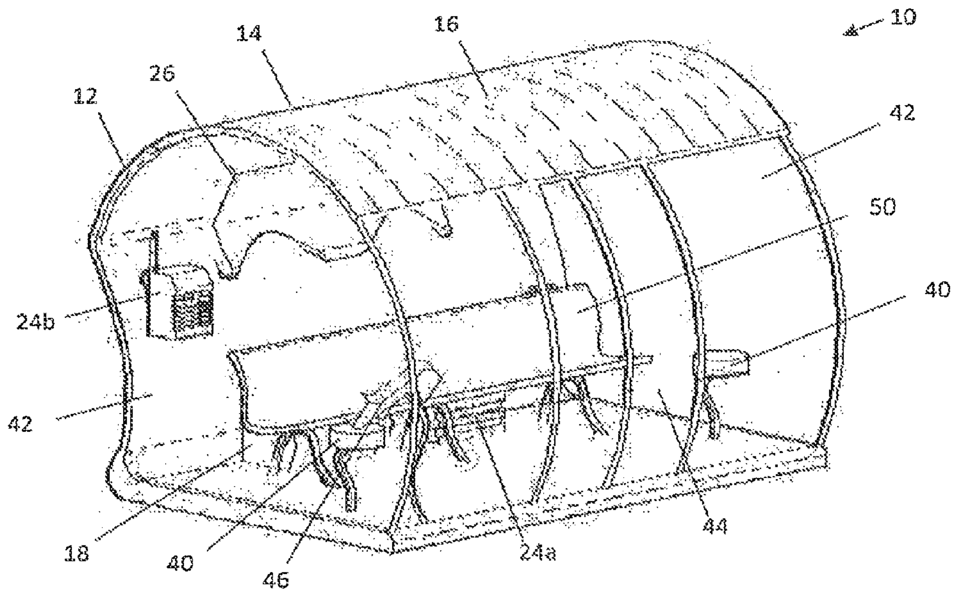
FIG. 1*a* is an isometric view of a system for supplying to energy in accordance with an embodiment of the present invention.
Figure 1B:
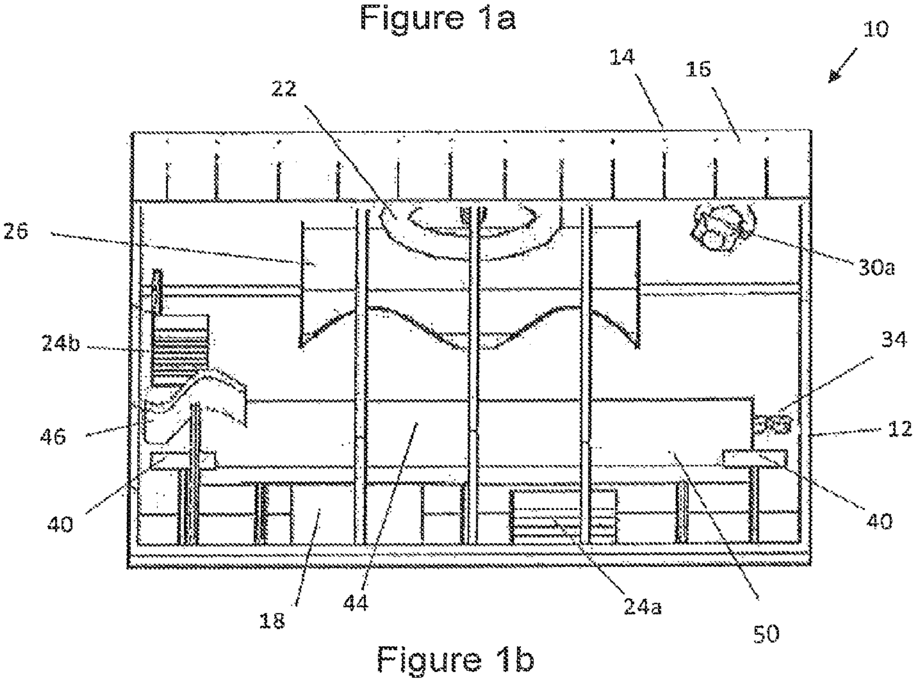
FIG. 1*b* is a front view of the system of FIG. 1*a;*
Figure 1C:
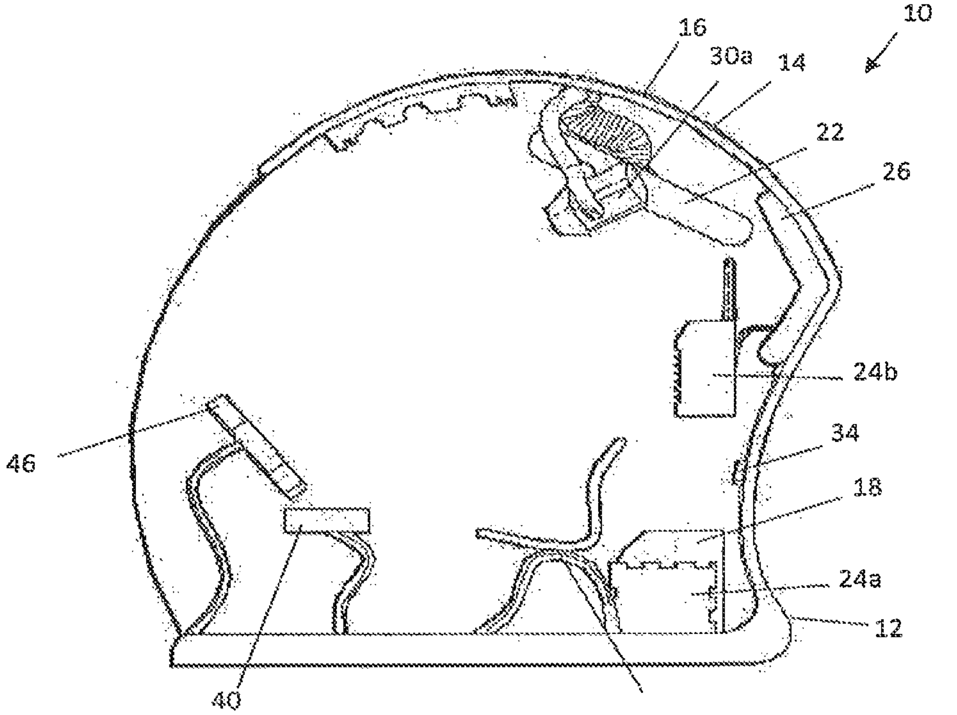
FIG. 1*c* is a side view of the system of FIG. 1*a;*
Figure 1D:
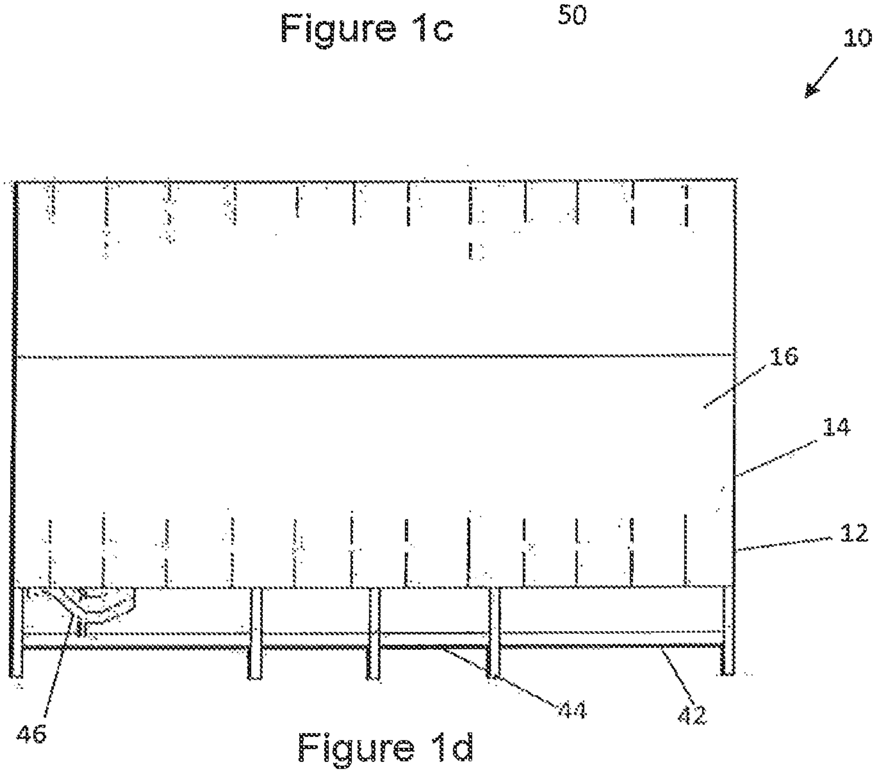
FIG. 1*d* is a top view of the system of FIG. 1*a*.
Figure 2:
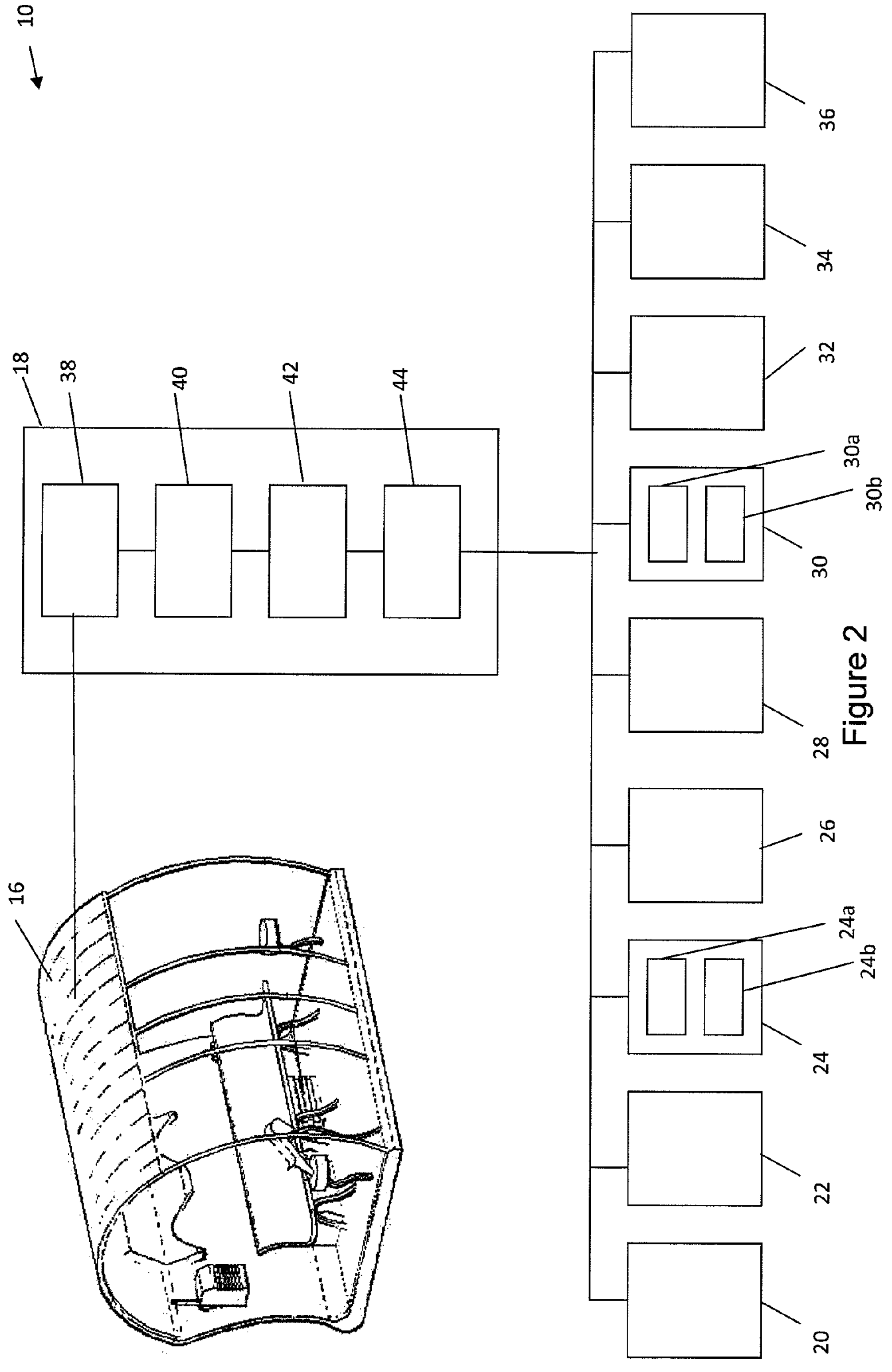
FIG. 2 is a schematic diagram of the system of FIG. 1.

Photovoltaic cells 16 are disposed on the roof portion 14, the photovoltaic cells 16 being arranged to convert solar energy into electrical energy. The system 10 comprises an energy distribution system 18, shown schematically in FIG. 2, arranged to receive electrical energy from the photovoltaic cells 16 and to provide the electrical energy to electrically powered components of the system.

The system 10 may comprise any manner and variety of electrically powered components. In general, the electrically powered components will provide some form of use, benefit, or effect for or on the awaiting passengers. For example, the system 10 may comprise any one or more of the following:

- a carbon collection system 20;
- a lighting system 22;
- a communications system 24;
- a display system 26;
- an audio system 28;
- a security system 30;
- a climate control system 32;
- a power outlet system 34; and
- a dryer system 36.

The energy distribution system 18 comprises components that allow it to receive electrical energy from the photovoltaic cells 16 and to power electrical components such as those listed above. In this example, the energy distribution system 18 comprises a battery system 40 arranged to store electrical energy provided by the photovoltaic cells 16. Electrical energy received from the photovoltaic cells 16 is fed to a charge controller 38 arranged to charge the battery system 40.

The battery system 40 is connected to an inverter 42 that is arranged to convert DC electricity stored in the battery system 40 to AC electricity that is usable by the components of the system 10. AC electricity output from the inverter 42 is then fed to an AC electrical distribution module 44 arranged to provide AC electricity to the components of the system 10.

The system 10 is arranged such that the electrically powered components of the system can receive stored electrical energy from the battery system 38, for example at times when sunlight is not impinging on the photovoltaic cells 16.

The shelter 12 may comprise further elements for providing comfort or services to awaiting passengers. In the example shown in FIG. 1, the shelter 12 comprises seats 50 for awaiting passengers, and is enclosed by glass walls 42 to provide shelter from weather such as rain and prevailing winds. Passengers are able to enter and exit the shelter 12 via a sliding glass door 44.

In the example shown in FIG. 1, the shelter 12 also comprises an information terminal 46. The information terminal 46 is powered by means of the energy distribution system 18, and can connect to a network via the communications system 24 to obtain information for use by the information terminal 46. The information terminal 46 comprises a display screen and an audio device for outputting information to a passenger, and an input device to allow a passenger to interact with the information terminal. In this example, the input device is integrated with the display to provide a touchscreen device. The information terminal 46 is usable to provide waiting passengers with bus timetables, bus routes, destination information, local time, weather forecasts or any appropriate information that may be desirable by a passenger.

The carbon collection system 20 is arranged to remove carbon from air around the shelter 12. In this example, the carbon collection system 20 is arranged to filter air that is around the shelter 12 so as to remove carbon based pollutants such as carbon dioxide and carbon monoxide for storage in the collection system 20. The carbon collection system 20 is also arranged to remove carbon from air within a region of the shelter 12 that is enclosed by the roof portion 14, glass walls 42 and sliding door 44.

The carbon collection system 20 provides the advantage of providing for improved air quality in the region surrounding the shelter 12. In this example, the shelter 12 is a bus shelter and is located in a region of relatively heavy vehicle traffic. As such, the carbon collection system 20 provides a means for removing carbon that has been emitted by vehicles in the region of the shelter 12. At the same time, the carbon collection system 20 is not contributing to pollution as it is ultimately powered by solar energy collected by the photovoltaic cells 16.

The system 10 is arranged to detect an amount of ambient light and to turn the lighting system 22 on if the amount of detected ambient light is below a predetermined threshold.

In one embodiment the system 10 comprises a light detector wherein the amount of ambient light is detected using the light detector. In another embodiment, the amount of ambient light is detected by measuring an output of the photovoltaic cells 16. In this embodiment, the system 10 is arranged such that, if the output of the photovoltaic cells 16 is below a predetermined threshold, the lighting system 10 is turned on. It will be appreciated that the energy for powering the lighting system 10 will be provided by the battery system 38 since, typically, the amount of sunlight impinging on the photovoltaic cells 16 at times when lighting is required would be insufficient to power the lighting system 10.

The communications system 24 comprises wireless 24*b* and wired (not shown) internet access points, which are powered by the energy distribution system 18. The communications system 24 comprises a telecommunications network interface 24*a* that is arranged to allow a user to connect to a core telecommunications network so as to provide telephone, ISDN and broadband such as DSL to the waiting passenger. In this example, the telecommunications network interface 24*a* is a self contained unit and is arranged to be powered by the energy distribution system 18, thereby allowing the communications system 24 to be installed with relative ease. Content, such as the advertising or television content, can be provided via the communications system 24.

The display system 26 and the audio system 28 can be arranged to operate separately or in conjunction with one another to provide information or services to passengers waiting at the shelter 12. For example, the display system 26 and the audio system 28 can operate together as an audio-visual system to deliver advertising content to the passengers, or to provide entertainment such as television shows.

The security system 30 may comprise an appropriate security monitoring system such as a closed circuit television (CCTV) system 30*a* or a security system that uses Internet protocol (IP) cameras. The CCTV system 30*a* is arranged to provide security video to security and/or law enforcement personnel to assist in monitoring the safety of passengers using the shelter 12 and to deter vandalism and other acts of antisocial behavior in and around the shelter 12. The security system 30 is powered by the energy distribution system 18 and can transmit video and/or audio to the security and/or law enforcement personnel via the communications system 24.

The security system 30 also comprises a panic button system which, when a panic button 30*b* is pressed, is arranged to emit an alert through the audio system 28 and/or to alert security and/or law enforcement personnel that the panic button has been pressed.

The climate control system 32 can be any appropriate system that allows a climate of or around shelter 12 to be at least partially controlled. In this example, wherein the shelter 12 is fully enclosable, the climate control system 32 is arranged to control the climate of the enclosed region of the shelter 12 and is in the form of an air conditioning system. In particular, the climate control system 32 comprises an air cooler and purifier that is arranged to reduce the ambient temperature of an enclosed region of the shelter 12 to a temperature that is comfortable to waiting passengers and to remove pollutants such as dust and pollen from air within the enclosed region of the shelter 12. The climate control system 32 may be adjustable by the waiting passengers, however in this particular example the climate control system 32 is set to maintain the climate of the enclosed region to a typically comfortable level.

The power outlet system 34 comprises a plurality of power outlets to which a waiting passenger is able to connect a power adapter or cable so as to power an electronic device, recharge a battery, or for any other appropriate function that a power outlet is typically used for. The power outlet system 34 can be arranged to cater for power plug configurations that are common in other countries. Power consumed by waiting passengers who use the power outlet system 34 is provided by the energy distribution system 18.

The dryer system 36 is arranged to dry waiting passengers and/or their articles such as cloths and bags. This is particularly advantageous in regions where rainfall is common, such as in tropical regions. The dryer system 36 has a typical air dryer configuration, wherein the dryer system 36 is arranged to output a stream of warm air through a nozzle in response to a user activating the dryer system 36. The dryer system 36 of this example can be activated by pressing a button, or by automatic sensing means arranged to detect the presence of an object beneath the nozzle.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A system for supplying energy, the system comprising:

a shelter for a passenger awaiting transport, the shelter having a roof portion;

photovoltaic cells disposed on the roof portion, the photovoltaic cells being arranged to convert solar energy into electrical energy; and an energy distribution system arranged to receive electrical energy from the photovoltaic cells and to provide the electrical energy to at least one electrically powered component of the system;

wherein the system comprises a battery system arranged to store electrical energy converted by the photovoltaic cells;

wherein the system is arranged such that the electrically powered components of the system can receive stored electrical energy from the battery system; and wherein the system comprises the following electrically powered components:

a carbon collection system;

a lighting system;

a communications system;

a display system;

an audio system;

a security system;

a climate control system;

a power outlet system; and a dryer system.

2. The system of claim 1, wherein the carbon collection system is arranged to remove carbon from air around the shelter.

3. The system of claim 2, wherein the carbon collection system is arranged to filter air that is around the shelter so as to remove carbon based pollutants for storage in the collection system.

4. The system of claim 2, wherein the shelter is enclosable and the carbon collection system is arranged to remove carbon from air within the enclosed region of the shelter.

5. The system of claim 1, wherein the lighting system is arranged to detect an amount of ambient light and to turn the lighting system on if the amount of detected ambient light is below a predetermined threshold.

6. The system of claim 5, wherein the light system comprises a light detector wherein the amount of ambient light is detected using the light detector.

7. The system of claim 5, wherein the amount of ambient light is detected by measuring an output of the photovoltaic cells.

8. The system of claim 1, wherein the communications system comprising wireless and/or wired internet access points that are powered by the energy distribution system.

9. The system of claim 8, wherein the communications system comprises a telecommunications network interface arranged to allow a user to connect to a core telecommunications network so as to provide telephone, ISDN and broadband to the waiting passenger.

10. The system of claim 9, wherein the telecommunications network interface is self contained and arranged to be powered by the energy distribution system.

11. The system of claim 1, wherein the display system and/er the audio system are arranged to provide information or services including advertising or entertainment to users of the shelter.

12. The system of claim 11, wherein the display system and the audio system operate in conjunction with one another to provide the information or services.

13. The system of claim 11, wherein content output by the display and/or audio systems is provided by the communications system.

14. The system of claim 1, wherein the security system comprises an appropriate security monitoring system including a closed circuit television system or a security system that uses Internet protocol (IP) cameras.

15. The system of claim 14, wherein the security system is arranged to provide security video to security and/or law enforcement personnel to assist in monitoring the safety of passengers using the shelter and/or to deter vandalism and other acts of antisocial behavior in and around the shelter.

16. The system of claim 15, wherein the security system is powered by the energy distribution system and is arranged to transmit video and/or audio to the security and/or law enforcement personnel via the communications system.

17. The system of claim 14, wherein the security system comprises a panic button system which, when a panic button is pressed, is arranged to emit an alert through the audio system and/or to alert security and/or law enforcement personnel that the panic button has been pressed.

18. The system of claim 1, wherein the climate control system is arranged to allow a climate of or around shelter to be at least partially controlled.

19. The system of claim 18, wherein the shelter is fully enclosable and the climate control system is arranged to control the climate of an enclosed region of the shelter.

20. The system of claim 19, wherein the climate control system is used to control the climate of an indoor space.

21. The system of claim 18, wherein the climate control system comprises an air cooler and purifier that is arranged to reduce the ambient temperature of an enclosed region of the shelter to a temperature that is comfortable to waiting passengers and to remove pollutants from air within the enclosed region of the shelter.

22. The system of claim 1, wherein the power outlet system comprises at least one power outlet to which a waiting passenger is able to connect a power adapter or cable, the power outlet system being arranged such that power consumed by waiting passengers who use the power outlet system is provided by the energy distribution system.

23. The system of claim 1, wherein the dryer system is arranged to dry waiting passengers and/or their articles.

24. The system of claim 23, wherein the dryer system has an air dryer configuration, wherein the dryer system is arranged to output a stream of warm air through a nozzle in response to a user activating the dryer system.

25. The system of claim 1, wherein:

the carbon collection system is arranged to remove carbon from air around the shelter;

the lighting system is arranged to detect an amount of ambient light and to turn the lighting system on if the amount of detected ambient light is below a predetermined threshold;

the communications system comprising wireless and/or wired internet access points that are powered by the energy distribution system;

the display system and the audio system are arranged to provide information or services to users of the shelter;

the security system comprises an appropriate security monitoring system including a closed circuit television system or a security system that uses Internet protocol (IP) cameras;

the climate control system is arranged to allow a climate of or around shelter to be at least partially controlled;

the power outlet system comprises at least one power outlet to which a waiting passenger is able to connect a power adapter or cable, the power outlet system being arranged such that power consumed by waiting passengers who use the power outlet system is provided by the energy distribution system; and the dryer system is arranged to dry waiting passengers and/or their articles.

* * * * *